Oct. 5, 1926.
E. A. LYNCH
1,601,920
BUMPER FOR AUTOMOBILES
Filed May 15, 1926
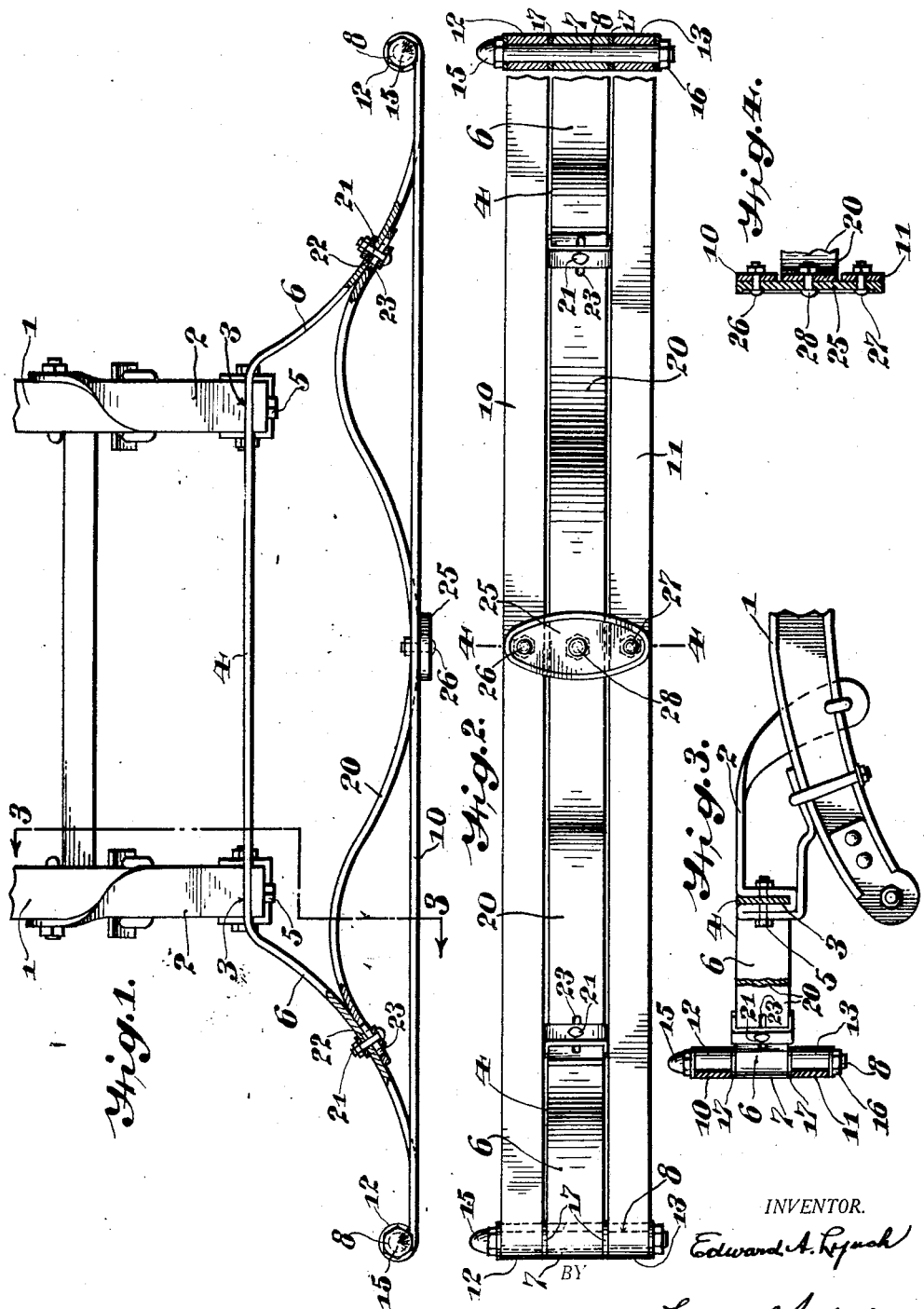
INVENTOR.
Edward A. Lynch
BY
Cyrus N. Anderson
ATTORNEY.

Patented Oct. 5, 1926.

1,601,920

UNITED STATES PATENT OFFICE.

EDWARD A. LYNCH, OF PENFIELD, PENNSYLVANIA.

BUMPER FOR AUTOMOBILES.

Application filed May 15, 1926. Serial No. 109,231.

My invention relates to bumpers for automobiles and other vehicles and is exemplified in an embodiment in modified form of the broad subject matter of the invention disclosed but not claimed in my co-pending application for Letters Patent of the United States filed October 6, 1925, Serial Number 60,710.

The general object of my invention is to provide a novel construction of bumper for automobiles or other like vehicles in which the elements are combined in a manner to produce a unitary structure capable of affording a maximum of protection in case of collision.

It also is an object of the invention to provide a novel but simplified bumper structure of a character such that it may be manufactured at a minimum of cost or expense.

To these and other ends the invention comprehends the broad as well as the specific features of construction as hereinafter described in detail, particularly pointed out in the claims and as depicted in the drawing in which I have illustrated one form of a convenient embodiment of the invention.

In the drawing:

Fig. 1 is a view in top plan of the front portion of the frame or chassis of a vehicle, such as an automobile, and of a bumper mounted thereon, the said bumper being shown partly in horizontal section;

Fig. 2 is a view in front elevation of the bumper, one end portion thereof being shown in vertical section;

Fig. 3 is a view in sectional elevation taken on the line 3—3 of Fig. 1; and

Fig. 4 is a view in transverse section taken on the line 4—4 of Fig. 2.

Referring to the drawing:—The front end portions of the opposite sides of the frame or chassis of an automobile or other vehicle structure are shown at 1. Mounted upon the said end portions 1 are brackets 2 which may be of any preferred form of construction and which may be secured to the end portions 1 of the opposite sides of the frame or chassis in any preferred known manner. In the construction as shown the brackets 2 are each provided with slots or seats 3 within which the relatively narrow metal resilient spring plate member or bar 4 is mounted. The said plate or bar 4 is secured in these slots or seats by means of bolts 5. The opposite end portions of the said metal plate 4 beyond the outer sides of the bracket 2 are inclined forwardly and outwardly, as indicated at 6, and constitute resilient spring members. These outwardly and forwardly extending portions 6 are curved as indicated, the convex sides thereof facing outwardly with respect to the car structure. That is, if the bumper is located upon the front end portions of the sides of the frame or chassis the convex sides of the said portions 6 face forwardly, whereas if the bumper should be located upon the rear end of the car the said convex sides would face rearwardly.

The outer ends of the extensions 6 terminate in eyes 7 within which shackle bolts 8 are mounted. These bolts are of substantially greater length than the width of the plate or bar 4 so that the opposite end portions thereof project a substantial distance above and below the opposite ends of the eyes 7. Relatively narrow metal spring plates or bars 10 and 11 are also provided with eyes 12 and 13 at their opposite ends which engage the upper and lower ends, respectively, of the bolts 8. The plates or bars 10 and 11 in the construction shown are straight but this is not an esesntial feature of the invention. These plates or bars 10 and 11 constitute tying means for connecting the outer ends of the extensions 6. The eyes 12 and 13 of the plates or bars 10 and 11 are retained upon the opposite end portions of the bolts 8 by means of nuts 15 and 16. The eyes 12 and 13 are spaced or separated from the eyes 7 by means of spacing washers 17. The presence of these washers 17 operates to space the opposite ends of the said bars or plates 10 and 11 from the outer ends of the extensions 6 of the metal spring plate or bar 4. A metal spring plate 20 is connected at its opposite ends by means of bolts 21 to intermediate portions of the extensions 6. The bolts 21 extend through openings 22 in the said extensions and also through slots 23 in the opposite end portions of the metal plate or bar 20.

The central portion of the metal plate or bar 20 is curved outwardly as shown in the drawing so that the central portion thereof is in vertical alinement with the central portions of the plates 10 and 11. The portions of the plate or bar 20 intermediate its middle point and the outer ends thereof are curved inwardly, as shown, so that the outer end portions thereof extend outwardly and forwardly in such manner that the outer rear sides thereof contact slidably with the front convex sides of the extensions 6.

The plates 10, 11 and 20 are connected together at their middle points by means of a vertical oval shaped bar 25. The said bar 25 is connected to each of the plates 10, 11 and 20 by means of bolts 26, 27 and 28.

In case of collision, if the impact should be upon the portion of the bumper intermediate the opposite ends thereof, the tendency would be for the cross plates or bars 10, 11 and 20 to bend inwardly. Such tendency on the part of the plates or bars 10 and 11 would tend to cause inward movement of the opposite end portions 6. Such movement would be resisted to some extent by the curved spring bar 20. The opposite ends of the latter would slide against the inner front sides of the extensions 6, such sliding movement being permitted by the engagement of the bolts 21 with the slots 23.

By my invention I am enabled to provide a construction of bumper which possesses the requisite strength and ruggedness and which is extremely efficient for the purpose for which such structures are intended.

Having thus described my invention, what I claim and desire to secure by Letters Patent is:

1. In a bumper for vehicles, the combination of resilient spring members located at the opposite ends thereof, a cross-wise extending spring plate having slidable connection at its opposite ends with the said resilient spring members at points intermediate their ends, and tying means having connection at their outer ends with the said oppositely disposed resilient spring members.

2. In a bumper for vehicles, the combination of resilient spring members located at the opposite ends thereof, a relatively narrow spring plate having slidable connection at its opposite ends with the said resilient spring members at points about midway between the inner and outer ends of said members, the middle portion of the said plate being curved outwardly and the opposite end portions thereof being curved inwardly and outwardly, relatively narrow spring plates having connection at their opposite ends with the outer ends of the said resilient spring members, one of the said plates being located above the said spring members and the other of said plates being located below the said spring members.

3. In a bumper for vehicles, the combination of resilient spring members located at the opposite ends thereof, a relatively narrow spring plate mounted upon and extending between the said spring members, the middle portion of said plate being curved outwardly and the opposite end portions thereof being curved inwardly, the outer ends thereof extending forwardly and outwardly and resting against the inner sides of the said spring members at points near the middles thereof, means for slidably connecting the opposite end portions of the said relatively narrow spring plate to the said spring members, relatively narrow spring plates connecting the outer ends of the said spring members, one of the said plates being located above and the other below the said members, the middle portions of said last mentioned plates being in vertical alinement with the first named relatively narrow curved plate, and means for connecting the middle portions of the said plates together.

4. In a bumper for vehicles, the combination of resilient spring members located at the opposite ends thereof, a relatively narrow spring plate mounted upon and extending between the said spring members, the middle portion of said plate being curved outwardly and the opposite end portions thereof being curved inwardly, the outer ends thereof extending forwardly and outwardly and resting against the inner sides of the said spring members at points near the middles thereof, means for slidably connecting the opposite end portions of the said relatively narrow spring plate to the said spring members, relatively narrow spring plates connecting the outer ends of the said spring members, one of the said plates being located above and the other below the said members, the middle portions of said last mentioned plates being in vertical alinement with the first named relatively narrow curved plate, means for connecting the middle portions of the said plates together, and a rigid bar extending transversely of and connected to the said plates.

In testimony that I claim the foregoing as my invention I have hereunto signed my name this 12th day of May, 1926.

EDWARD A. LYNCH.